United States Patent
Wiesner et al.

(10) Patent No.: US 10,919,287 B2
(45) Date of Patent: *Feb. 16, 2021

(54) METHOD AND DEVICE FOR CONTROLLING AN IRRADIATION SYSTEM IN DEPENDENCE ON A WORK PIECE GEOMETRY

(71) Applicant: SLM Solutions Group AG, Luebeck (DE)

(72) Inventors: Andreas Wiesner, Luebeck (DE); Dieter Schwarze, Luebeck (DE); Toni Adam Krol, Luebeck (DE)

(73) Assignee: SLM SOLUTIONS GROUP AG, Luebeck (DE)

( * ) Notice: Subject to any disclaimer, the term of this patent is extended or adjusted under 35 U.S.C. 154(b) by 150 days.

This patent is subject to a terminal disclaimer.

(21) Appl. No.: 15/215,133

(22) Filed: Jul. 20, 2016

(65) Prior Publication Data

US 2017/0021572 A1    Jan. 26, 2017

(30) Foreign Application Priority Data

Jul. 20, 2015  (EP) ..................... 15177464

(51) Int. Cl.
*B33Y 50/02*    (2015.01)
*B33Y 10/00*    (2015.01)
(Continued)

(52) U.S. Cl.
CPC ............ *B33Y 50/02* (2014.12); *B22F 3/1055* (2013.01); *B23K 26/0604* (2013.01);
(Continued)

(58) Field of Classification Search
CPC . B29C 67/0088; B29C 64/153; B29C 64/386; B33Y 50/02; B23K 26/082; B23K 26/342; B23K 26/0604; B22F 3/1055
See application file for complete search history.

(56) References Cited

U.S. PATENT DOCUMENTS 6,013,915 A      1/2000  Watkins
9,878,497 B2 *   1/2018  Schwarze ............. B22F 3/1055
(Continued)

FOREIGN PATENT DOCUMENTS

CN    101070470 A    11/2007
CN    101144742 A     3/2008
(Continued)

OTHER PUBLICATIONS

Decision of Refusal, JP2016-138084, dated Nov. 7, 2017, 9 pages, with partial translation.
(Continued)

*Primary Examiner* — Michael P Wieczorek
(74) *Attorney, Agent, or Firm* — Taft Stettinius & Hollister LLP

(57) ABSTRACT

In a method for controlling an irradiation system for use in an apparatus for producing a three-dimensional work piece, a first and a second irradiation area as well as an overlap area arranged between the first and the second irradiation area are defined on a surface of a carrier adapted to receive layers of a raw material powder to be irradiated with electromagnetic or particle radiation emitted by the irradiation system. A first irradiation unit of the irradiation system is assigned to the first irradiation area and the overlap area, and a second irradiation unit of the irradiation system is assigned to the second irradiation area and the overlap area. At least one of the first irradiation area, the second irradiation area and the overlap area is defined in dependence on a geometry of the three-dimensional work piece to be produced.

7 Claims, 4 Drawing Sheets

Figure 1:
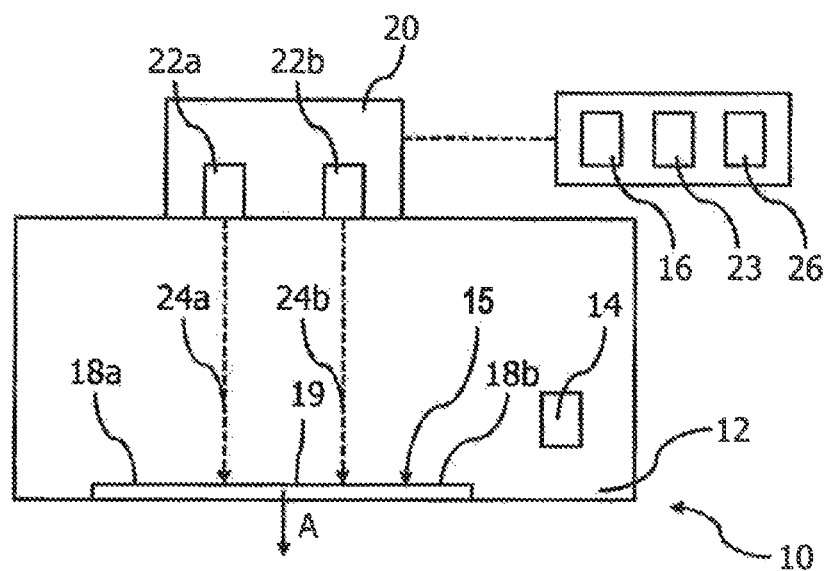

(51) Int. Cl.
  *B23K 26/02* (2014.01)
  *B23K 26/342* (2014.01)
  *B22F 3/105* (2006.01)
  *B29C 64/153* (2017.01)
  *B23K 26/06* (2014.01)
  *B23K 26/082* (2014.01)
  *B33Y 30/00* (2015.01)
  *B23K 26/08* (2014.01)

(52) U.S. Cl.
  CPC .......... *B23K 26/082* (2015.10); *B23K 26/342* (2015.10); *B29C 64/153* (2017.08); *B22F 2003/1056* (2013.01); *B22F 2003/1057* (2013.01); *B33Y 10/00* (2014.12); *B33Y 30/00* (2014.12); *Y02P 10/25* (2015.11)

(56) References Cited

U.S. PATENT DOCUMENTS

2014/0182775 A1  7/2014  Taniuchi et al.
2014/0348691 A1* 11/2014  Ljungblad ............. B22F 3/1055
                                                  419/53

FOREIGN PATENT DOCUMENTS

| CN | 101183575 A | 5/2008 |
| CN | 101823860 A | 9/2010 |
| CN | 102615917 A | 8/2012 |
| CN | 102728838 A | 10/2012 |
| EP | 2875897 A1 | 5/2015 |
| RU | 2564355 C1 | 9/2015 |
| WO | 2013082199 A1 | 6/2013 |
| WO | 2014187606 A1 | 11/2014 |
| WO | 2015003937 A1 | 1/2015 |
| WO | 2015024670 A1 | 2/2015 |

OTHER PUBLICATIONS

Notification of Reasons of Refusal (Partial Translation), JP2016-138084, dated Aug. 22, 2017, 7 pages.
Examination Report dated Feb. 6, 2018 in corresponding Russian application No. 2016128554 (2 pages).
Patent Office of the People's Republic of China, English Translation of Search Report dated May 13, 2018 cited in counterpart CN Patent Application No. 2016105757892 (2 pages).

* cited by examiner

METHOD AND DEVICE FOR CONTROLLING AN IRRADIATION SYSTEM IN DEPENDENCE ON A WORK PIECE GEOMETRY

The present invention relates to a method and a device for controlling an irradiation system for use in an apparatus for producing a three-dimensional work piece by irradiating layers of a raw material powder with electromagnetic or particle radiation. Furthermore, the invention relates to an apparatus for producing a three-dimensional work piece.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

As described in EP 2 786 585 A1, operation of an irradiation system employed in an apparatus for producing a three-dimensional work piece by selectively irradiating layers of a raw material powder with electromagnetic or particle radiation, by means of a control unit, may be controlled such that a radiation beam emitted by the irradiation system is guided over a raw material powder layer according to a radiation pattern. Typically, the radiation pattern contains a plurality of scan vectors which, in at least a section of the radiation pattern, extend substantially parallel to each other. Further, the radiation pattern may comprise a plurality of sections, wherein, in each section, the scan vectors may extend substantially parallel to each other, but inclined relative to the scan vectors in an adjacent section of the radiation pattern. The sections of the radiation pattern may define a chessboard pattern, a stripe pattern comprising a plurality of substantially parallel stripes or a pattern comprising arbitrarily shaped sections.

Further, as discussed in EP 2 786 585 A1, in order to produce a large three-dimensional work piece, the raw material powder may be irradiated with electromagnetic or particle radiation by means of an irradiation system comprising a plurality of irradiation units, wherein each irradiation unit may be associated with an irradiation area defined on a surface of a carrier onto which the raw material powder to be irradiated is applied. Each irradiation unit of the irradiation system is controlled such that the raw material powder applied onto the irradiation area associated with the irradiation unit is irradiated in a site selective manner and independent of the irradiation of other irradiation areas not associated with the irradiation unit in question. Hence, each irradiation area defined on the carrier may be individually and independently irradiated using a desired irradiation pattern. Beside the irradiation areas, at least one overlap area may be defined on the surface of the carrier. Raw material powder applied onto the overlap area can be selectively irradiated with electromagnetic or particle radiation by at least two irradiation units of the irradiation system.

EP 2 875 897 A1 also discloses a method and a device for controlling an irradiation system for use in an apparatus for producing a three-dimensional work piece and comprising a plurality of irradiation units, wherein each irradiation unit is assigned to an irradiation area as well as an overlap area arranged between adjacent irradiation areas, the irradiation areas and the overlap area being defined on a surface of a carrier which is adapted to receive a layer of raw material powder. If it is determined that a section of a radiation pattern according to which radiation beams emitted by the irradiation units of the irradiation system are guided over the layer of raw material powder received on the carrier and/or a contour of the three-dimensional work piece to be produced extend(s) into the first and the second irradiation area defined on the surface of the carrier, said section of the radiation pattern and/or said contour, in a splitting region of the section of the radiation pattern and/or the contour which is located in the overlap area arranged between the first and the second irradiation area, is split into a first portion and a second portion. The first portion of said section of the radiation pattern and/or said contour is assigned to the first irradiation unit and the second portion of said section of the radiation pattern and/or said contour is assigned to the second irradiation unit.

The invention is directed at the object of providing a method and a device, which allow an irradiation system for use in an apparatus for producing a three-dimensional work piece by irradiating layers of a raw material powder with electromagnetic or particle radiation and comprising a plurality of irradiation units to be controlled in such a manner that a three-dimensional work piece can be produced at a high-efficiency. Further, the invention is directed at the object of providing an apparatus for producing a three-dimensional work piece which is equipped with a device for controlling an irradiation system of this kind.

This object is addressed by a method as defined in the claims.

In a method for controlling an irradiation system for use in an apparatus for producing a three-dimensional work piece, a first and a second irradiation area as well as an overlap area arranged between the first and the second irradiation area are defined on a surface of a carrier adapted to receive a layer of raw material powder. The carrier may be disposed in a process chamber of the apparatus for producing a three-dimensional work piece and may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. The process chamber may be sealable against the ambient atmosphere, i.e. against the environment surrounding the process chamber, in order to be able to maintain a controlled atmosphere, in particular an inert atmosphere within the process chamber. The raw material powder to be received on the carrier preferably is a metallic powder, in particular a metal alloy powder, but may also be a ceramic powder or a powder containing different materials. The powder may have any suitable particle size or particle size distribution. It is, however, preferable to process powders of particle sizes <100 µm.

The first and the second irradiation area may be disposed adjacent to one another on the surface of the carrier. The overlap area may be defined in an adjoining region of the first and the second irradiation area such that the overlap area partially overlaps with both the first and the second irradiation area. Further, the overlap area may comprise a boundary between the overlap area and the first irradiation area and a boundary between the overlap area and the second irradiation area determining a position and a size of the overlap area on the surface of the carrier.

The irradiation system to be controlled serves to selectively irradiate the raw material powder applied onto the carrier with electromagnetic or particle radiation. In particular, the raw material powder applied onto the carrier may be subjected to electromagnetic or particle radiation in a site-selective manner in dependence on the desired geometry of the work piece that is to be produced. The irradiation system preferably is adapted to irradiate radiation onto the raw material powder which causes a site-selective melting of the raw material powder particles.

In the method for controlling an irradiation system, a first irradiation unit of the irradiation system is assigned to the first irradiation area and the overlap area such that the first irradiation area and the overlap area can be irradiated with electromagnetic or particle radiation emitted by the first irradiation unit. Further, a second irradiation unit of the irradiation system is assigned to the second irradiation area and the overlap area such that the second irradiation area and the overlap area can be irradiated with electromagnetic or particle radiation emitted by the second irradiation unit. As a result, the first irradiation area may be exclusively irradiated with electromagnetic or particle radiation emitted by the first irradiation unit, whereas the second irradiation area may be exclusively irradiated with electromagnetic or particle radiation emitted by the second irradiation unit. Compared thereto, the overlap area may be irradiated by both irradiation units. For example, the overlap area may be irradiated with electromagnetic or particle radiation emitted by both irradiation units simultaneously. This may be realized by splitting a radiation pattern extending into the overlap area into sections and by selectively irradiating these sections with electromagnetic or particle radiation emitted by one of the irradiation units, respectively. Preferably, however, the overlap area is irradiated with electromagnetic or particle radiation emitted by either the first or the second irradiation unit.

Each irradiation area defined on the surface of the carrier, i.e. the raw material powder applied thereon, may be selectively irradiated with electromagnetic or particle radiation by a selected one of the irradiation units of the irradiation system independent from the other irradiation units of the irradiation system. Hence, each irradiation area defined on the carrier may be individually and independently irradiated using a desired irradiation pattern.

Each irradiation unit of the irradiation system may comprise a radiation beam source, in particular a laser beam source. It is, however, also conceivable that plural irradiation units are associated with a single radiation beam source, wherein a radiation beam provided by the single radiation beam source, by suitable means such as, for example, beam splitters and/or mirrors, may be split and/or deflected as required so as to direct the radiation beam provided by the radiation beam source to the associated irradiation units. Further, each irradiation unit may comprise at least one optical unit for guiding and/or processing a radiation beam emitted by the radiation beam source and supplied to the irradiation unit. The optical unit may comprise optical elements such as an object lens, in particular an f-theta lens, and a scanner unit, the scanner unit preferably comprising a diffractive optical element and a deflection mirror.

In the method for controlling an irradiation system, at least one of the first irradiation area, the second irradiation area and the overlap area is defined in dependence on a geometry, i.e. a shape and an arrangement relative to the surface of the carrier of the three-dimensional work piece to be produced. In particular, a size, shape and a position relative to the surface of the carrier of at least one of the first irradiation area, the second irradiation area and the overlap area may be defined in dependence on the geometry of the three-dimensional work piece to be produced. As a result, an assignment of the irradiation units of the irradiation system to surface portions of the carrier and a control of an operation of the irradiation units of the irradiation system, may also be effected in dependence on the geometry of the three-dimensional work piece to be produced. As a result, the degree of capacity utilization of the irradiation units of the irradiation system can be optimized allowing a significant reduction of the production time for large or specifically shaped three-dimensional work pieces. Consequently, the method for controlling an irradiation system allows three-dimensional work pieces to be built-up in an additive layer construction process within a relatively short time, at reasonable costs and thus at a high efficiency.

As indicated above, in an additive layering process, a three-dimensional work piece is built-up layer by layer on the surface of the carrier by subsequently irradiating the individual layers with electromagnetic or particle radiation. Typically, the shape, the size and the position relative to the surface of the carrier of the individual layers stacked on top of each other, in dependence on the final geometry of the work piece to be produced, changes in a direction perpendicular to the surface of the carrier. Therefore, in a preferred embodiment of the method for controlling an irradiation system, at least one of the first irradiation area, the second irradiation area and the overlap area is defined for each layer of the three-dimensional-work piece to be produced in dependence on a geometry of the layer of the three-dimensional work piece to be produced. This allows controlling the operation of the irradiation units of the irradiation system, i.e. assigning the irradiation units of the irradiation system to surface portions of the carrier in dependence of the geometry of the individual layers of the work piece to be produced.

At least one of the first irradiation area, the second irradiation area and the overlap area may be defined for each layer of the three-dimensional work piece to be produced in dependence on an area coverage of the first irradiation area, the second irradiation area and the overlap area by the layer of the three-dimensional work piece to be produced. The term "areal coverage" in this context refers to a ratio between a portion of the first irradiation area, the second irradiation area and the overlap area, respectively, which is "covered" by the layer of the three-dimensional work piece and the total area of the first irradiation area, the second irradiation area and the overlap area, respectively. Thus, in the method for controlling an irradiation system, in a first step, the area coverage of the first irradiation area, the second irradiation area and the overlap area by a layer of the three-dimensional work piece to be produced may be determined. Thereafter, in a second step, at least one of the first irradiation area, the second irradiation area and the overlap area, i.e. for example the size, the shape and the position relative to the surface of the carrier of at least one of the first irradiation area, the second irradiation area and the overlap area may be defined in dependence on said area coverage so as to optimize the capacity utilization of the irradiation units of the irradiation system for each layer of the three-dimensional work piece to be produced.

In a preferred embodiment of the method for controlling an irradiation system, a position relative to the surface of the carrier, a shape and a size of the first and the second irradiation area may be maintained constant, whereas at least one of a position relative to the surface of the carrier, a shape and a size of the overlap area may be varied in dependence on the geometry of the three-dimensional work piece to be produced. As indicated above, the overlap area may be irradiated with electromagnetic or particle radiation by both irradiation units of the irradiation system. Therefore, in many operational situations, by changing at least one of the position relative to the surface of the carrier, the shape and the size of the overlap area, an additional irradiation unit of the irradiation system can be involved in an irradiation process performed by only one irradiation unit so far without it being necessary to also adjust the position relative to the surface of the carrier, the shape and the size of the first and the second irradiation area. Thus, the control strategy to be employed for optimizing the degree of capacity utilization of the irradiation units of the irradiation system can be less complex.

For example, a size of the overlap area may be increased and/or a shape and/or a position of the overlap area may be shifted towards one of the first and the second irradiation area in case an area coverage of the first irradiation area by a layer of the work piece to be produced differs from an areal coverage of the second irradiation area by the layer of the work piece to be produced. Hence, by adjusting the size, the shape and/or the position relative to the surface of the carrier of the overlap area to the areal coverage of the first and the second irradiation area by the layer of the work piece to be produced, an imbalance of the areal coverage of the first and the second irradiation area by the layer of the work piece to be produced can be at least partially compensated for.

In particular, a size of the overlap area may be increased and/or a shape and/or a position relative to the surface of the carrier of the overlap area may be shifted towards the first irradiation area by shifting a boundary between the overlap area and the first irradiation area in the direction of the first irradiation area, in case an areal coverage of the first irradiation area by a layer of the work piece to be produced is larger than an areal coverage of the second irradiation area by the layer of the work piece to be produced. As a result, for a work piece layer which mainly is arranged in the first irradiation area, the second irradiation unit may be involved in the irradiation process to a larger extent as that would be possible without adjusting at least one of the size, the shape and the position relative to the surface of the carrier of the overlap area.

Similarly, a size of the overlap area may be increased and/or a shape and/or a position relative to the surface of the carrier of the overlap area may be shifted towards the second irradiation area by shifting a boundary between the overlap area and the second irradiation area in the direction of the second irradiation area, in case an areal coverage of the first irradiation area by a layer of the work piece to be produced is smaller than an areal coverage of the second irradiation area by the layer of the work piece to be produced. As a result, for a work piece layer which mainly is arranged in the second irradiation area, the first irradiation unit may be involved in the irradiation process to a larger extent as that would be possible without adjusting at least one of the size, the shape and the position relative to the surface of the carrier of the overlap area.

Finally, also the areal coverage of the overlap area by a layer of the three-dimensional work piece to be produced may be considered upon controlling the first and the second irradiation area. For example, in case the areal coverage of the first irradiation area by the layer of the work piece to be produced is substantially equal to or larger than the combined areal coverage of the second irradiation area and the overlap area by the layer of the work piece to be produced, the first and the second irradiation unit may be controlled such that the first irradiation unit is exclusively assigned to the first irradiation area, whereas the overlap area and the second irradiation area are irradiated with electromagnetic or particle radiation emitted by the second radiation unit. To the contrary, in case the areal coverage of the second irradiation area by the layer of the work piece to be produced is substantially equal to or larger than the combined areal coverage of the first irradiation area and the overlap area by the layer of the work piece to be produced, the first and the second irradiation unit may be controlled such that the second irradiation unit is exclusively assigned to the second irradiation area, whereas the overlap area and the first irradiation area are irradiated with electromagnetic or particle radiation emitted by the first radiation unit.

A device for controlling an irradiation system for use in an apparatus for producing a three-dimensional work piece comprises a definition unit adapted to define a first and a second irradiation area as well as an overlap area arranged between the first and the second irradiation area on a surface of a carrier adapted to receive a layer of raw material powder to be irradiated with electromagnetic or particle radiation emitted by the irradiation system. The device further comprises an assigning unit adapted to assign a first irradiation unit of the irradiation system to the first irradiation area and the overlap area such that the first irradiation area and the overlap area can be irradiated with electromagnetic or particle radiation emitted by the first irradiation unit, and to assign a second irradiation unit of the irradiation system to the second irradiation area and the overlap area such that the second irradiation area and the overlap area can be irradiated with electromagnetic or particle radiation emitted by the second irradiation unit. The definition unit is adapted to define at least one of the first irradiation area, the second irradiation area and the overlap area in dependence on a geometry of the three-dimensional work piece to be produced.

In a preferred embodiment of the device, the definition unit is adapted to define at least one of the first irradiation area, the second irradiation area and the overlap area for each layer of the three-dimensional work piece to be produced in dependence on a geometry of the layer of the three-dimensional work piece to be produced.

The definition unit may further be adapted to define at least one of the first irradiation area, the second irradiation area and the overlap area for each layer of the three-dimensional work piece to be produced in dependence on an areal coverage of the first irradiation area, the second irradiation area and the overlap area of the layer of the three-dimensional work piece to be produced.

The definition unit of the device for controlling an irradiation system may be adapted to maintain a position relative to the surface of the carrier, a shape and a size of the first and the second irradiation area constant, but to vary at least one of a position relative to the surface of the carrier, a shape and a size of the overlap area in dependence on the geometry of the three-dimensional work piece to be produced.

In particular, the definition unit may be adapted to increase a size of the overlap area and/or to shift a shape and/or a position of the overlap area relative to the surface of the carrier towards one of the first and the second irradiation area, in case an areal coverage of the first irradiation area by a layer of the work piece to be produced differs from an area coverage of the second irradiation area by the layer of the work piece to be produced.

In particular, the definition unit may be adapted to increase the size of the overlap area and/or to shift a shape and/or a position of the overlap area relative to the surface of the carrier towards the first irradiation area by shifting a boundary between the overlap area and the first irradiation area in the direction of the first irradiation area in case an area coverage of the first irradiation area by a layer of the work piece to be produced is larger than an area coverage of the second irradiation area by the layer of the work piece to be produced.

Similarly, the definition unit may be adapted to increase the size of the overlap area and/or to shift a shape and/or a position of the overlap area relative to the surface of the carrier towards the second irradiation area by shifting a boundary between the overlap area and the second irradiation area in the direction of the second irradiation area, in case an areal coverage of the first irradiation area by a layer of the work piece to be produced is smaller than an areal coverage of the second irradiation area by the layer of the work piece to be produced.

An apparatus for producing a three-dimensional work piece is equipped with a device for controlling an irradiation system as described above.

Figure 2:
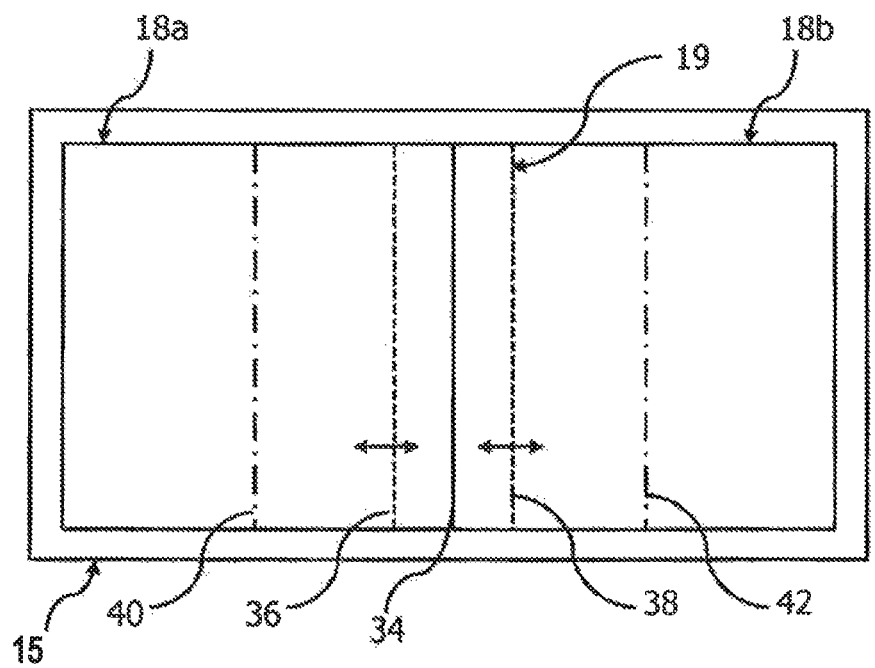
Figure 3:
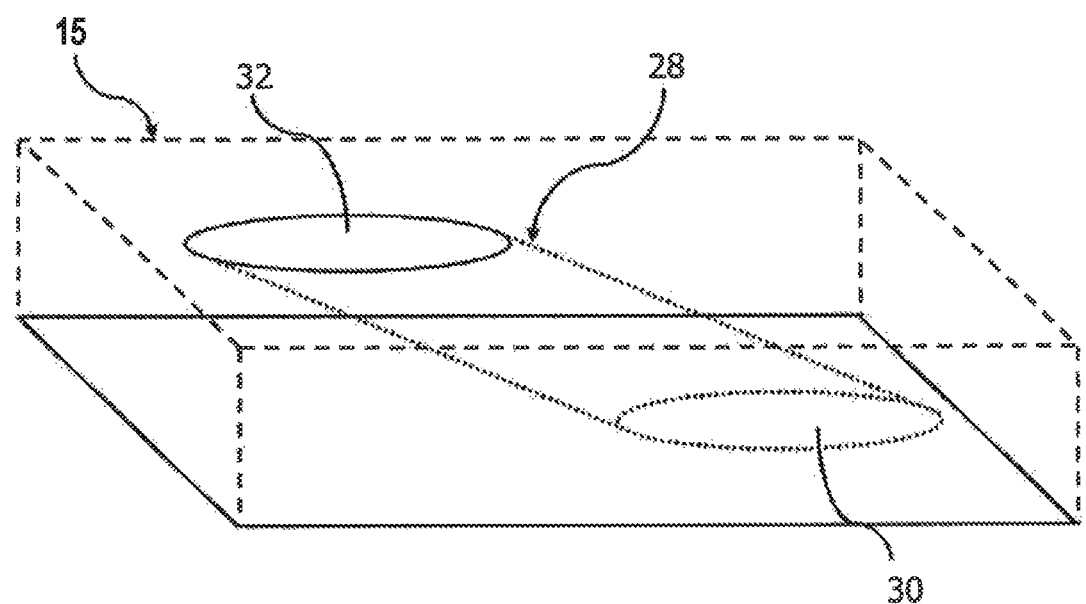
Figure 4:
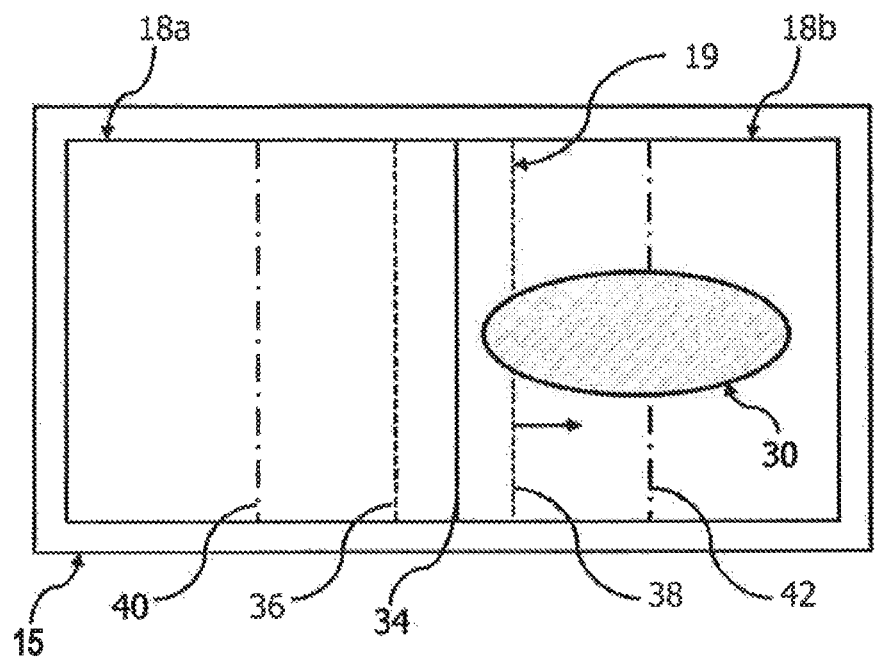
Figure 5:
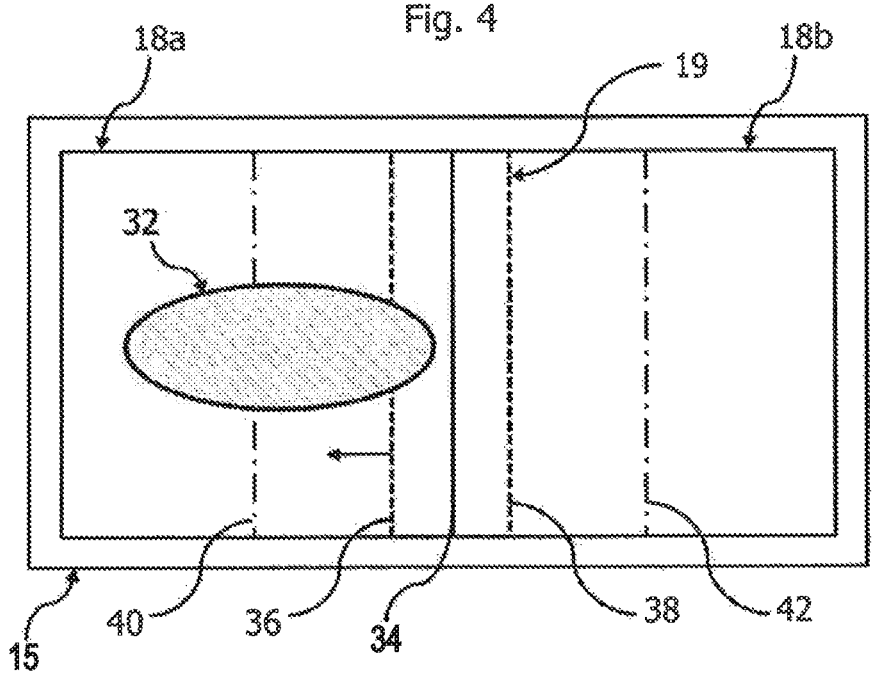
Figure 6:
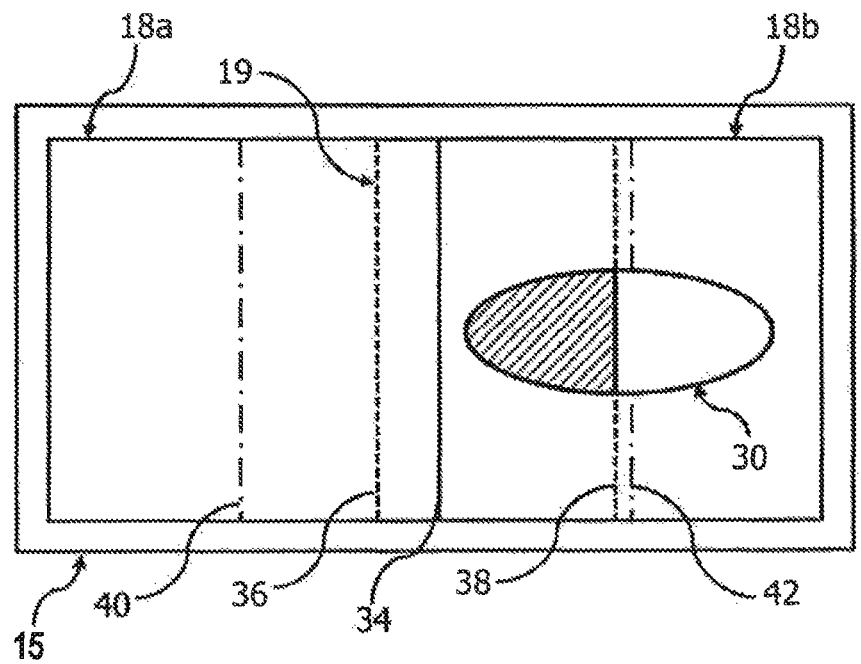
Figure 7:
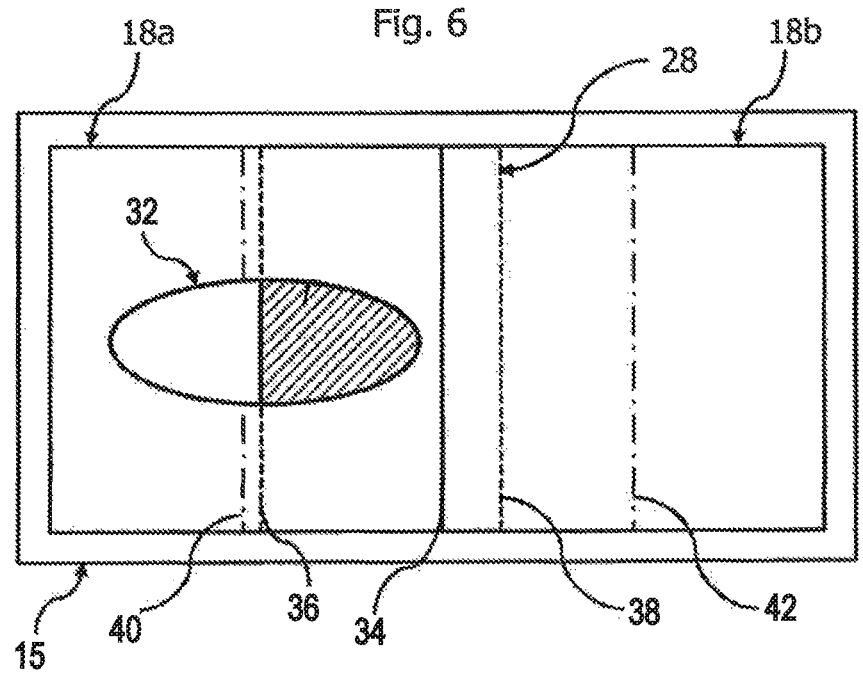

Further features, advantages and technical effects of the invention will become apparent from the following description of exemplary embodiments with reference to the accompanying schematic drawings, in which:

FIG. 1 shows a schematic representation of an apparatus for producing a three-dimensional work piece, FIG. 2 shows a top view of a carrier of the apparatus depicted in FIG. 1, FIG. 3 shows a perspective representation of the carrier of the apparatus depicted in FIG. 1 accommodating a three-dimensional work piece to be produced, FIGS. 4 and 6 show the step of defining the first and the second irradiation area as well as the overlap area on the surface of the carrier depicted in FIG. 2 in order to produce a first layer of the three-dimensional work piece, and FIGS. 5 and 7 show the step of defining the first and the second irradiation area as well as the overlap area on the surface of the carrier depicted in FIG. 2 in order to produce a second layer of the three-dimensional work piece.

FIG. 1 shows an apparatus 10 for producing three-dimensional work pieces by powder bed fusion. The apparatus 10 comprises a process chamber 12. The process chamber 12 is sealable against the ambient atmosphere, i.e. against the environment surrounding the process chamber 12. A powder application device 14, which is disposed in the process chamber 12, serves to apply a raw material powder onto a carrier 15. As indicated by an arrow A in FIG. 1, the carrier 15 is designed to be displaceable in a vertical direction so that, with increasing construction height of a work piece, as it is built up in layers from the raw material powder on the carrier 15, the carrier 15 can be moved downwards in the vertical direction.

The apparatus 10 further comprises a definition unit 16. By means of the definition unit 16, a first and a second irradiation area 18a, 18b are defined on a surface of the carrier 15. In addition, the definition unit 16 defines an overlap area 19 on the surface of the carrier 15, see FIGS. 1 and 2. The overlap area 19 is arranged between the first and the second irradiation area 18a, 18b.

The apparatus 10 further comprises an irradiation system 20 for selectively irradiating laser radiation onto the raw material powder applied onto the carrier 15. By means of the irradiation system 20, the raw material powder applied onto the carrier 15 may be subjected to laser radiation in a site-selective manner. The irradiation system 20 comprises a first and a second irradiation unit 22a, 22b. An assigning unit 23 is operative to assign the first irradiation unit 22a of the irradiation system 20 to the first irradiation area 18a and the overlap area 19 which are defined on the surface of the carrier 15 by means of the definition unit 16. Hence, the first irradiation unit 22a may selectively irradiate an electromagnetic or particle radiation beam 24a onto the raw material powder applied onto the first irradiation area 18a and the overlap area 19. Moreover, the assigning unit 23 is operative to assign the second irradiation unit 22b to the second irradiation area 18b and the overlap area 19 which are defined on the surface of the carrier 15 by means of the definition unit 16. Hence, the second irradiation unit 22b may selectively irradiate an electromagnetic or particle radiation beam 24b onto the raw material powder applied onto the second irradiation area 18b and the overlap area 19. Preferably, the first and the second irradiation unit 22a, 22b emit a laser beam.

Each irradiation unit 22a, 22b may comprise an associated laser beam source. It is, however, also conceivable that both irradiation units 22a, 22b are associated with a single laser beam source, wherein a radiation beam provided by the single radiation beam source, by suitable means such as, for example, beam splitters and/or mirrors, may be split and/or deflected as required so as to direct the radiation beam provided by the radiation beam source to the irradiation units 22a, 22b. A laser beam source associated with only one irradiation unit 22a, 22b or with both irradiation units 22a, 22b may, for example, comprise a diode pumped Ytterbium fibre laser emitting laser light at a wavelength of approximately 1070 to 1080 nm.

Further, each irradiation unit 22a, 22b may comprise an optical unit for guiding and/or processing a radiation beam emitted by the radiation beam source and supplied to the irradiation unit 22a, 22b. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens.

The operation of the irradiation system 20 is controlled by means of a control device 26 such that the radiation beams 24a, 24b emitted by the irradiation units 22a, 22b are irradiated onto the raw material powder applied onto the irradiation area 18a, 18b associated with the irradiation unit 22a, 22b in a site selective manner and independent of the irradiation of the other irradiation area 18a, 18b not associated with the irradiation unit 22a, 22b in question. In other words, each irradiation area 18a, 18b defined on the carrier 15 is individually and independently irradiated. As a result, a three-dimensional work piece may be built-up on the carrier 15 in an additive layer construction process by simultaneously irradiating the first and the second irradiation area 18a, 18b defined on the carrier 15 with electromagnetic or particle radiation emitted by the irradiation units 22a, 22b.

As already indicated above, raw material powder applied onto the overlap area 19 defined on the surface of the carrier 15 basically may be selectively irradiated with electromagnetic or particle radiation emitted by both irradiation units 22a, 22b of the irradiation system 20. Thus, in case the assigning unit 23 assigns the first irradiation unit 22a not only to the first irradiation area 18a, but also to the overlap area 19, the control device 26 controls the irradiation units 22a, 22b of the irradiation system 20 in such a manner that the overlap area 19 is irradiated with electromagnetic or particle radiation emitted by the first irradiation unit 22a. To the contrary, in case the assigning unit 23 assigns the second irradiation unit 22b not only to the second irradiation area 18b, but also to the overlap area 19, the control device 26 controls the irradiation units 22a, 22b of the irradiation system 20 in such a manner that the overlap area 19 is irradiated with electromagnetic or particle radiation emitted by the second irradiation unit 22b. Finally, in certain operational situations it is, however, also conceivable that the overlap area 19, under the control of the control device 26, is simultaneously irradiated with electromagnetic or particle radiation emitted by both the first irradiation unit 22a and the second irradiation unit 22b.

The definition unit 16 of the apparatus 10 defines at least one of the first irradiation area 18a, the second irradiation area 18b and the overlap area 19 in dependence on the geometry, i.e. a shape and an arrangement within the process chamber 12 relative to the surface of the carrier 15 of the three-dimensional work piece to be produced. In particular, a size, a shape and a position relative to the surface of the carrier 15 of at least one of the first irradiation area 18a, the second irradiation area 18b and the overlap area 19 may be defined in dependence on the geometry of the three-dimensional work piece to be produced. As a result, an assignment of the irradiation units 22a, 22b of the irradiation system 20 to the first irradiation area 18a, the second irradiation area 18b and the overlap area 19 defined on the surface of the carrier 15 as well as a control of an operation of the irradiation units 22a, 22b may also be effected in dependence on the geometry of the three-dimensional work piece to be produced.

In particular, the definition unit 16 defines at least one of the first irradiation area 18a, the second irradiation area 18b and the overlap area 19 for each layer of the work piece to be produced in dependence on a geometry of the layer of the three-dimensional work piece to be produced. This will be explained in further detail below with reference to an exemplary embodiment of a three-dimensional work piece 28 which is depicted in FIG. 3.

The work piece 28 has the shape of an oblique cylinder which extends in an oblique manner from the surface of the carrier 15 through the process chamber 12. A first layer of the work piece 28 in FIG. 3 is indicated with reference numeral 30, whereas a second layer of the work piece 28 in FIG. 3 is indicated with reference numeral 32. The first layer 30 forms a bottom layer of the work piece 28, whereas the second layer 32 defines a top layer of the work piece 28. As the work piece 28 is built up in layers in an additive layering process, the first bottom layer 30 is generated on the surface of the carrier 15. Thereafter the carrier 15 is lowered in the vertical direction A and further layers are generated until finally the second top layer 32 is produced.

Due to the geometry of the work piece 28, i.e. due to its shape and arrangement within the process chamber 12, an arrangement of the individual layers of the work piece 28 relative to the surface of the carrier 15 and hence the irradiation areas 18a, 18b and the overlap area 19 defined on the surface of the carrier 15 changes from layer to layer. In particular, an areal coverage of the first irradiation area 18a, the second irradiation area 18b and the overlap area 19 by the individual layers of the work piece 28, i.e. a ratio between a portion of the first irradiation area 18a, the second irradiation area 18b and the overlap area 19, respectively, which is "covered" by the layer of the three-dimensional work piece 28 and the total area of the first irradiation area 18a, the second irradiation area 18b and the overlap area 19, respectively, changes from layer to layer.

As becomes apparent from FIG. 4, the first layer 30 of the work piece 28 is arranged relative to the surface of the carrier 15 so as to cover a part of the second irradiation area 18b and a part of the overlap area 19, but not to extend into the first irradiation area 18a. Hence, for the first layer 30, the areal coverage of the second irradiation area 18b by the first layer 30 is larger than the areal coverage of the first irradiation area 18a by the first layer 30 (the latter in fact being zero). To the contrary, as shown in FIG. 5, the second layer 32 of the work piece 28 is arranged relative to the surface of the carrier 15 so as to cover a part of the first irradiation area 18a and part of the overlap area 19, but not to extend into the second irradiation area 18b. Hence, for the second layer 32, the areal coverage of the first irradiation area 18a by the second layer 32 is larger than the areal coverage of the second irradiation area 18b by the second layer 32 (the latter in fact being zero).

Assuming that the arrangement of the first irradiation area 18a, the second irradiation area 18b and the overlap area 19 on the surface of the carrier 15 is maintained constant upon producing the first layer 30 and the second layer 32, the first layer 30 would mainly be produced by irradiating the raw material powder for generating the first layer 30 by the second irradiation unit 22b in the second irradiation area 18b, while only a small part of the first layer 30, namely the part extending into the overlap area 19, could be produced with the aid of the first irradiation unit 22a. Similarly, the second layer 32 would mainly be produced by irradiating the raw material powder for generating the second layer 32 by the first irradiation unit 22a in the first irradiation area 18a, while only a small part of the second layer 32, namely the part extending into the overlap area 19, could be produced using the second irradiation unit 22b.

In order to compensate for this imbalance of the capacity utilization of the irradiation units 22a, 22b, the definition unit 16 defines at least one of the first irradiation area 18a, the second irradiation area 18b and the overlap area 19 for each layer of the work piece 28 to be produced in dependence on the areal coverage of the first irradiation area 18a, the second irradiation area 18b and the overlap area 19 by the layer of the three-dimensional work piece to be produced. In particular, in order to limit the complexity of the employed control strategy, the definition unit 16 maintains a position, a shape and a size of the first and the second irradiation area 18a, 18b constant, but varies at least one of a position, a shape and a size of the overlap area 19 in dependence on the geometry of the three-dimensional work piece 28 to be produced. Specifically, the definition unit 16 increases a size of the overlap area 19 and/or shifts a shape and/or a position of the overlap area 19 towards one of the first and the second irradiation area 18a, 18b in case an areal coverage of the first irradiation area 18a by a layer 30, 32 of the work piece 28 to be produced differs from an area coverage of the second irradiation area 18b by the layer 30, 32 of the work piece 28 to be produced.

In case of the exemplary work piece 28, the definition unit 16 maintains the position, the substantially rectangular shape and the size of the first and the second irradiation area 18a, 18b, which are separated from each other along a line 34, constant, while increasing the size of the overlap area 19 arranged between the first and the second irradiation area 18a, 18b. Specifically, the definition unit 16 effects the increase in size of the overlap area 19 by shifting a boundary 36, 38 between the overlap area 19 and the first and the second irradiation area 18a, 18b, respectively towards the respective irradiation area 18a, 18b in the direction of an outer limit line 40, 42 defining the maximum extension of the overlap area 19 in the direction of the first and the second irradiation area 18a, 18b, respectively.

In particular, for the first layer 30, the boundary 38 between the overlap area 19 and the second irradiation area 18b is shifted towards the second irradiation area 18b and the outer limit line 42 in order to increase the overlap area 19, see FIG. 6. Since a part of the first layer 30 which covers the overlap area 19 can be produced by the first irradiation unit 22a, the first irradiation unit 22a can be involved in the production of the first layer 30 to a much greater extent than this would be possible with the original arrangement of the overlap area 19 according to FIG. 4. Similarly, for the second layer 32, the boundary 36 between the overlap area 19 and the first irradiation area 18a is shifted towards the first irradiation area 18a and the outer limit line 40 in order to increase the overlap area 19, see FIG. 7. Since a part of the second layer 32 which covers the overlap area 19 can be produced by the second irradiation unit 22b, the second irradiation unit 22b can be involved in the production of the second layer 32 to a much greater extent than this would be possible with the original arrangement of the overlap area 19 according to FIG. 5. This procedure is repeated for each layer of the work piece 28. As a result, capacity utilization of the irradiation units 22a, 22b can be optimized and the efficiency of the production process for generating the work piece 20 can be significantly enhanced.

The invention claimed is:

1. A method for controlling, by a control device, an irradiation system of an apparatus for producing a three-dimensional work piece, the method comprising the steps of:
    defining, by a definition unit of the apparatus and during performance of an additive layer construction process to produce the three-dimensional work piece, a first and a second irradiation area, as well as an overlap area arranged between the first and the second irradiation area, on a surface of a carrier of the apparatus adapted to receive layers of a raw material powder to be irradiated with electromagnetic or particle radiation emitted by the irradiation system to produce the three-dimensional work piece made of the raw material powder by the additive layer construction process,
    assigning, by an assigning unit of the apparatus and during performance of the additive layer construction process to produce the three-dimensional work piece, a first irradiation unit of the irradiation system to the first irradiation area and the overlap area such that the first irradiation area and the overlap area can be irradiated with electromagnetic or particle radiation emitted by the first irradiation unit, and
    assigning, by the assigning unit and during performance of the additive layer construction process to produce the three-dimensional work piece, a second irradiation unit of the irradiation system to the second irradiation area and the overlap area such that the second irradiation area and the overlap area can be irradiated with electromagnetic or particle radiation emitted by the second irradiation unit,
    wherein at least one of the first irradiation area, the second irradiation area, and the overlap area is defined by the definition unit in dependence on a geometry of the three-dimensional work piece to be produced, and further wherein a size of the overlap area is increased or at least one of a shape and a position of the overlap area is shifted by the definition unit towards one of the first and the second irradiation areas to compensate for an imbalance in capacity utilization of the first and second irradiation units based on differences of the geometry of the three-dimensional work piece to be produced within each of the first and second irradiation areas.

2. The method according to claim 1,
wherein a position, a shape and a size of the first and the second irradiation area are maintained constant, whereas at least one of the position, the shape and the size of the overlap area is varied in dependence on the geometry of the three-dimensional work piece to be produced.

3. The method according to claim 1,
wherein the size of the overlap area is increased and/or the shape and/or the position of the overlap area is shifted towards one of the first and the second irradiation areas in case an areal coverage of the first irradiation area by a layer of the work piece to be produced differs from an areal coverage of the second irradiation area by the layer of the work piece to be produced.

4. The method according to claim 1,
wherein the size of the overlap area is increased and/or the shape and/or the position of the overlap area is shifted towards the first irradiation area by shifting a boundary between the overlap area and the first irradiation area in the direction of the first irradiation area in case an areal coverage of the first irradiation area by a layer of the work piece to be produced is larger than an areal coverage of the second irradiation area by the layer of the work piece to be produced.

5. The method according to claim 1,
wherein the size of the overlap area is increased and/or the position of the overlap area is shifted towards the second irradiation area by shifting a boundary between the overlap area and the second irradiation area in the direction of the second irradiation area in case an areal coverage of the first irradiation area by a layer of the work piece to be produced is smaller than an areal coverage of the second irradiation area by the layer of the work piece to be produced.

6. A method for controlling, by a control device, an irradiation system of an apparatus for producing a three-dimensional work piece, the method comprising the steps of:
    defining, by a definition unit of the apparatus and during performance of an additive layer construction process to produce the three-dimensional work piece, a first and a second irradiation area, as well as an overlap area arranged between the first and the second irradiation area, on a surface of a carrier of the apparatus adapted to receive layers of a raw material powder to be irradiated with electromagnetic or particle radiation emitted by the irradiation system to produce the three-dimensional work piece made of the raw material powder by the additive layer construction process,
    assigning, by an assigning unit of the apparatus and during performance of the additive layer construction process to produce the three-dimensional work piece, a first irradiation unit of the irradiation system to the first irradiation area and the overlap area such that the first irradiation area and the overlap area can be irradiated with electromagnetic or particle radiation emitted by the first irradiation unit, and assigning, by the assigning unit and during performance of the additive layer construction process to produce the three-dimensional work piece, a second irradiation unit of the irradiation system to the second irradiation area and the overlap area such that the second irradiation area and the overlap area can be irradiated with electromagnetic or particle radiation emitted by the second irradiation unit, wherein at least one of the first irradiation area, the second irradiation area, and the overlap area is defined by the definition unit for each layer of the three-dimensional work piece to be produced in dependence on a geometry of the layer of the three-dimensional work piece to be produced, and further wherein a size of the overlap area is increased or at least one of a shape and a position of the overlap area is shifted by the definition unit towards one of the first and the second irradiation areas for each layer to be produced to compensate for an imbalance in capacity utilization of the first and second irradiation units based on differences of the geometry of the three-dimensional work piece to be produced within each of the first and second irradiation areas.

7. A method for controlling, by a control device, an irradiation system of an apparatus for producing a three-dimensional work piece, the method comprising the steps of:

defining, by a definition unit of the apparatus and during performance of an additive layer construction process to produce the three-dimensional work piece, a first and a second irradiation area, as well as an overlap area arranged between the first and the second irradiation area, on a surface of a carrier of the apparatus adapted to receive layers of a raw material powder to be irradiated with electromagnetic or particle radiation emitted by the irradiation system to produce the three-dimensional work piece made of the raw material powder by the additive layer construction process, assigning, by an assigning unit of the apparatus and during performance of the additive layer construction process to produce the three-dimensional work piece, a first irradiation unit of the irradiation system to the first irradiation area and the overlap area such that the first irradiation area and the overlap area can be irradiated with electromagnetic or particle radiation emitted by the first irradiation unit, and assigning, by the assigning unit and during performance of the additive layer construction process to produce the three-dimensional work piece, a second irradiation unit of the irradiation system to the second irradiation area and the overlap area such that the second irradiation area and the overlap area can be irradiated with electromagnetic or particle radiation emitted by the second irradiation unit, wherein at least one of the first irradiation area, the second irradiation area, and the overlap area is defined by the definition unit for each layer of the three-dimensional work piece to be produced in dependence on an areal coverage of the first irradiation area, the second irradiation area, and the overlap area by the layer of the three-dimensional work piece to be produced, and further wherein a size of the overlap area is increased or at least one of a shape and a position of the overlap area is shifted by the definition unit towards one of the first and the second irradiation areas for each layer to be produced to compensate for an imbalance in capacity utilization of the first and second irradiation units based on differences of the geometry of the three-dimensional work piece to be produced within each of the first and second irradiation areas.

* * * * *